(12) United States Patent
Kroncke

(10) Patent No.: US 6,219,593 B1
(45) Date of Patent: Apr. 17, 2001

(54) METHOD AND APPARATUS FOR ATTITUDE DETERMINATION IN A MULTI-NODAL SYSTEM

(75) Inventor: George Thomas Kroncke, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/261,023

(22) Filed: Mar. 1, 1999

(51) Int. Cl.$^7$ ........................................ G01S 5/00
(52) U.S. Cl. .............. 701/13; 244/171; 342/355
(58) Field of Search .............. 701/13, 226; 244/164, 244/171; 342/352, 355, 126

(56) References Cited

U.S. PATENT DOCUMENTS

| | | | |
|---|---|---|---|
| 4,883,244 | * 11/1989 | Challoner et al. | 244/171 |
| 5,043,737 | * 8/1991 | Dell-Imagine | 342/358 |
| 5,101,356 | * 3/1992 | Timothy et al. | 701/213 |
| 5,109,346 | 4/1992 | Wertz | 364/459 |
| 5,430,657 | * 7/1995 | Kyrtsos | 701/226 |
| 5,446,465 | * 8/1995 | Diefes et al. | 342/357 |
| 5,534,875 | * 7/1996 | Diefes et al. | 342/357.11 |
| 5,935,183 | 8/1999 | Sahm et al. | 701/50 |
| 5,935,196 | * 8/1999 | Brodie et al. | 701/226 |
| 5,959,576 | * 9/1999 | Ring | 342/357.11 |

FOREIGN PATENT DOCUMENTS

| | | |
|---|---|---|
| 0482472 | 10/1991 | (EP) . |
| 0023817 | 4/2000 | (WO) . |

OTHER PUBLICATIONS

An article entitled "Intersatellite Laser Ranging Experiment For Global Change Sensing and 21$^{st}$ Century Satellite Control" by David M. Gleason from Proceedings of the SPIE vol. 2374/249, Feb. 6, 1995, XP000900028.

* cited by examiner

*Primary Examiner*—Michael J. Zanelli
*Assistant Examiner*—Eric M Gibson
(74) *Attorney, Agent, or Firm*—Frank J. Bogacz

(57) ABSTRACT

A method and apparatus determines attitude of a satellite (52) or other communications device traveling in a determinable path. The method comprises determining orientation data describing directions of one or more narrow-beam RF or laser communications channels (223, 225, 231, 233, 241, 251, 253, and 261; FIG. 2) and using the orientation data and known position of the satellite to determine the attitude of the satellite. The apparatus comprises one or more directional transmitters and receivers (310, 312, 314, 316, 318, and 320; FIG. 3) coupled to controller (330), where controller (330) accepts orientation controller data from the one or more directional transmitters and receivers and determines the satellite's attitude based on the orientation controller data and the known positions of the transmitters and receivers.

13 Claims, 4 Drawing Sheets

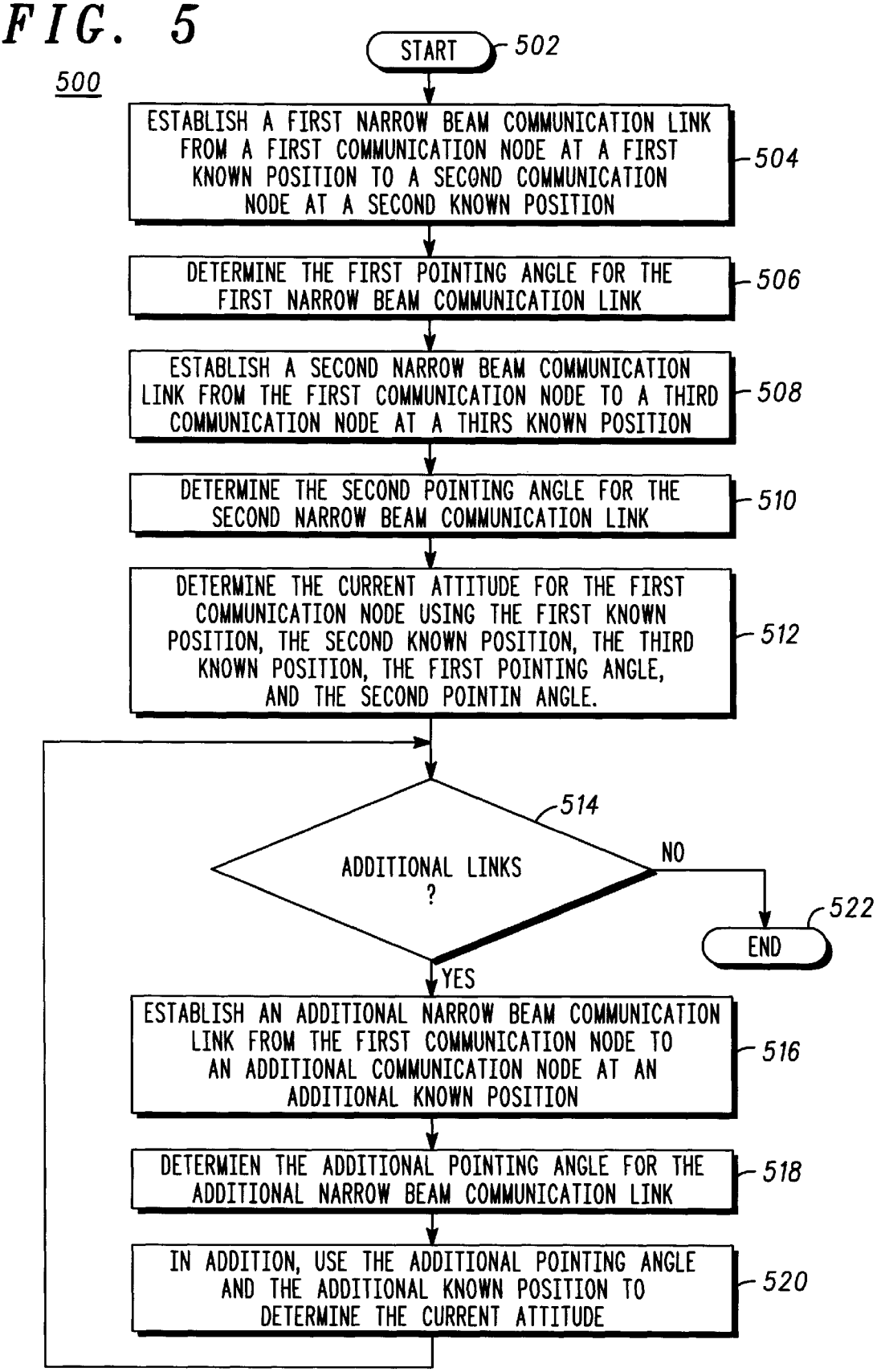

METHOD AND APPARATUS FOR ATTITUDE DETERMINATION IN A MULTI-NODAL SYSTEM

FIELD OF THE INVENTION

The present invention relates to an apparatus and method for determining the attitude of an orbiting satellite.

BACKGROUND OF THE INVENTION

The "attitude" of a satellite describes the satellite's orientation with respect to a reference coordinate system (e.g., earth-based or star-based). The attitude of a satellite is fully described using three parameters (e.g., by pitch, yaw, and roll angles).

In a satellite communications system, precise knowledge of a satellite's attitude is essential to achieve efficient, low-power communications with ground sites or other satellites. Communications systems on-board the satellite need accurate attitude information to be able to direct their transmissions (e.g., radio frequency or laser), to a remotely located receiver. Accurate attitude information is particularly essential for communications at higher frequencies, which often rely on very narrow communications beams (e.g., hundreds of microradians).

Prior-art attitude determination systems typically use various combinations of rotation sensors (gyroscopes), star-referencing devices (sensors, trackers or mappers), earth horizon sensors, sun sensors, and/or magnetometers to determine a satellite's attitude. Each of these prior-art devices are described below, along with their various advantages and disadvantages for satellite communications applications.

Rotation sensors are prior-art devices that monitor a satellite's change in attitude. Because rotation sensors only monitor attitude changes, they alone cannot determine a satellite's absolute attitude. For this reason, rotation sensors are useful to maintain an attitude once it has been established, but not to determine an attitude initially or on an ongoing basis.

Prior-art star-referencing devices are useful when high-precision attitude determination is desired. High-precision attitude determination may be achieved because star-referencing devices use stars, which are unambiguous point sources of light, as reference points. A star-referencing device looks at a reference star (i.e., a star whose exact position is known to the satellite attitude-determination system) and may partially determine a satellite's attitude relative to that star. The relative attitude measurement can then be related to any reference coordinate system in which the star is located.

A complete description of the satellite's attitude may not be determined using a single star-reference device's measurements because one axis exists about which the satellite's attitude is not known. Specifically, there is an ambiguity about the line-of-sight from the satellite to the star. An additional measurement about another axis may be used to resolve the ambiguity. This single-axis ambiguity is inherent also in rotation sensors, horizon sensors, sun sensors, and magnetometers.

A star-referencing device has several drawbacks. First, the star-referencing device cannot provide attitude determination measurements when no reference stars are in view. When continuous attitude determination capability is needed, an attitude-determination system based on a star-referencing device would require an additional attitude-determination device (e.g., a rotation sensor) in addition to the star-referencing device to keep track of the attitude during the times when reference stars are not in view.

Another drawback is that a star-referencing device cannot operate when it is looking at reference stars within a few degrees of the surfaces of the Earth, Sun, or Moon, because their brightness could damage the device.

Additionally, attitude determination using a star-referencing device requires knowledge of the locations, brightness and sometimes colors of many reference stars. Thus, relatively large computer memory is required for star catalog storage and high processing capability is required for star-identification calculations.

Another drawback is that star-referencing devices are expensive, heavy, and require more power than other types of sensors.

Another prior-art attitude determination device is an earth horizon sensor which uses the "limb" (i.e., the boundary between space and earth) to determine a satellite's attitude. Like all the other prior-art sensors, the horizon sensor can not provide attitude information about one axis. A horizon sensor may determine all three angles of an attitude by waiting through a significant portion of a quarter of an orbit, taking new measurements, and combining the new measurements with previous measurements. Inaccuracies in the attitude determination are inherent in this method, however, because the previous measurements may not be completely accurate a quarter of an orbit later.

Earth horizon sensors are inaccurate due to the atmospheric "fuzziness" of the earth's horizon. Additionally, a horizon sensor must have a stored geoid model due to the non-spherical nature of the earth (e.g., equatorial bulge). Such a geoid model may add significant computational complexity. Another drawback is that a horizon sensor is calibrated to a particular altitude. Therefore, the satellite must orbit at that altitude to achieve accurate results.

A sun sensor is a prior-art device that determines attitude by establishing a line-of-sight between a satellite and the sun. Similar to other sensors, the sun sensor cannot determine attitude about the line-of-sight from the satellite to the sun. Sun sensors are relatively inexpensive, and require little power.

However, sun sensors can be used to determine attitude only when the sun's image is in view. Thus, a sun sensor cannot determine attitude when the satellite is in the shadowed portion of the satellite's orbit (in low-earth orbits, this may be up to one third of the orbit) or when the satellite's attitude is such that the sun does not lie within the sun sensor's field of view. Like star-referencing devices, this limitation necessitates an additional attitude determination device to determine the attitude when the sun is not within the sensor's field of view. Sun sensors may be less accurate than star-referencing devices because the sun sensor utilizes the sun's image as a reference point. Compared with a star which approximates a point of light, the sun is a large disk. Because the sun's center may be difficult to determine and locate, pointing inaccuracies are inherent in a sun sensor.

A magnetometer is a prior-art device that determines a satellite's attitude by measuring the earth's magnetic field at the satellite and comparing it with a magnetic field model at the same location. The magnetometer, like other sensors, provides no information about the measurement axis.

One disadvantage is that a magnetometer is not highly accurate. One reason is that a satellite's own magnetic field is also measured by the magnetometer, thus corrupting the magnetometer readings. Additionally, the magnetic field model may not accurately account for variations in the earth's magnetic field. This is especially true at higher latitudes (i.e., near the poles).

Two primary performance limiting factors in every satellite are the mass (or weight) and available electrical power. Satellite mass is constrained by the high cost of launching a satellite (i.e., getting the satellite to orbit) and the performance limitations of the launch vehicle. A satellite's available electrical power is constrained by how much power a satellite's solar array can produce.

To increase satellite payload performance capabilities, mass, and power availability should be redistributed within a satellite. Any mass or power requirement that can be eliminated from the bus portion of the satellite (i.e., the satellite payload-support portion) may be made available for the payload to use to improve its performance.

Besides the individual disadvantages of rotation sensors, star-referencing devices, horizon sensors, sun sensors and magnetometers, they also share common disadvantages. Each prior-art device requires additional power, adds weight to the satellite bus, and increases equipment costs.

Also, the consequences of equipment failure are great with prior-art devices. Without accurate attitude determination capability, a satellite is unable to perform communications functions properly. If it cannot determine its attitude, a satellite may not be able to determine where to point its communications antennas or lasers. A satellite whose attitude determination equipment has failed may have to be deorbited, potentially resulting in lost communications capability for an entire system. Additionally, satellite replacement costs (e.g., equipment and launch costs) are significant.

Thus, what is needed is an attitude determination method and apparatus that is accurate, reliable, and does not require additional expensive, power-consuming or heavy equipment to the satellite. What is further needed is an attitude determination method and apparatus that is capable of complete attitude determination at any time within a satellite's orbit without relying on other attitude-determination devices.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference characters refer to similar items throughout the figures and:

FIG. 5 illustrates a flowchart of a method of determining attitude in accordance with a preferred embodiment of the present invention.

Figure 1:
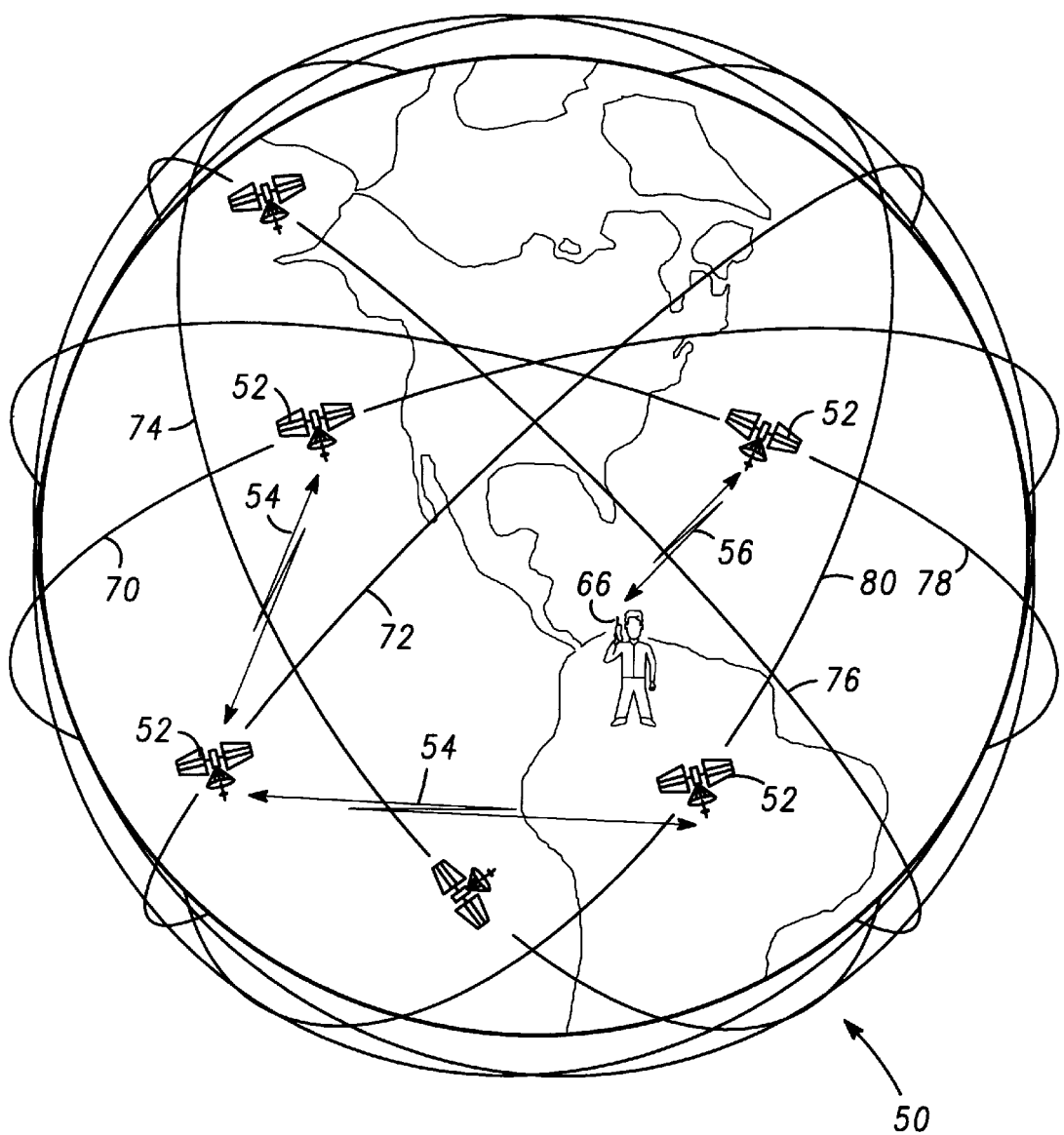
FIG. 1 illustrates a simplified diagram of a satellite-based, cellular communications system in accordance with a preferred embodiment of the present invention.

The exemplification set out herein illustrates a preferred embodiment of the invention in one form thereof and such exemplification is not intended to be construed as limiting in any manner.

DETAILED DESCRIPTION OF THE DRAWINGS

Generally, the present invention provides an apparatus and a method for determining the attitude of communications nodes (e.g., satellites or ground sites) in a system having multiple communications nodes using cross-links (i.e., a communications link between two nodes). The primary advantage to the present invention is that it provides attitude determination capabilities while requiring no additional hardware beyond that which is already required for the cross-link communications. Multiple bus functions are accomplished using one device, thus adding no additional mass or power requirements. The need for a separate attitude determination device can be eliminated using the present invention. This provides the significant advantage of eliminating a separate device's associated mass, power requirements, and equipment costs. The mass and power requirements eliminated from the bus portion of the satellite may be made available for the payload to use to improve its performance. Thus, the present invention provides a method and apparatus for determining satellite attitude measurements with less additional equipment, allowing redistribution of mass and power resources and, thus, enhanced payload performance.

The present invention enables a satellite with a known orbit position to determine its attitude based on the directions in which its communications beams are pointed toward other satellites or ground sites, also at known positions. The present invention implements a unique method for establishing attitude measurements based on known orbiting satellite positions.

The advantages to the present invention are numerous. The present invention utilizes data obtained from communications equipment that must exist on-board the satellite for communications purposes (e.g., a laser communications device). A major advantage the present invention has over the other prior-art methods discussed is that the present invention requires that little or no equipment be used solely for attitude determination. Thus, the present invention decreases the need for heavy attitude-determination equipment. Accompanying this decrease in equipment is a savings in a satellite's available electrical energy and the cost of the equipment.

Another advantage is that, when an extremely narrow beam is used, the present invention should provide more accurate results than prior-art methods using a horizon sensor, sun sensor, or magnetometer. Unlike these prior-art apparatuses, the present invention is not affected by:

atmospheric fuzziness which affects a horizon sensor's readings;

complex magnetic models which induce magnetometer measurement inaccuracies because they cannot fully model actual conditions;

a satellite's magnetic field which induces magnetometer reading inaccuracies;

delays between readings for a complete attitude determination inherent in horizon sensor calculations; or the large size of the sun as a reference point which adds difficulty to sun sensor measurements.

Another advantage to the present invention is that a complete attitude determination may be made at any time, unlike star-referencing devices which cannot determine attitude measurements when reference stars are not in view, horizon sensors which must wait a portion of an orbit to completely determine attitude, or sun sensors which cannot determine attitude when the sun is not in view. The star-referencing devices, horizon sensors, and sun sensors must rely on additional attitude determination devices (e.g., rotation sensors) if complete attitude determination capability is desired at all times. The present invention does not depend on additional attitude determination devices, although the present invention may be integrated with additional attitude determination devices, if desired.

The present invention may be integrated and used in several ways. Optimally, the present invention may be used to eliminate the need for prior-art sensors. The advantages to this use are significant as described in this specification. Alternatively, the present invention may be used in conjunction with other sensors in an attitude determination subsystem (e.g., a horizon sensor) to calibrate, monitor, and enhance the performance of the other attitude sensor. An existing attitude sensor determination subsystem and the attitude determination sensor system of the present invention could each determine the current attitude of the satellite. Performance measurements could be produced by comparing the current attitude measurements. When a comparison reveals that the difference between the two current attitude measurements is greater than some predetermined threshold, the satellite could take action, including declaring an error condition or calibrating the existing attitude determination subsystem, if possible. Performance measurements may be used to predict the degradation and loss of the nominal space vehicle attitude determination capability.

The present invention may also be used as a backup system to an existing attitude determination system. This use would eliminate the need to deorbit a satellite when the existing on-board system fails. Using the present invention with an existing system does not add any significant weight or power requirements to the satellite.

To determine attitude initially, the communications device can institute a search for a target satellite using a defocused (wider) beam. After the communications link between the two satellites is established, the current attitude can be determined to the required precision using the present invention.

Alternatively, the present invention may be used in conjunction with a low-cost, low-performance, attitude determination subsystem to determine the initial satellite attitude. The low-cost attitude determination subsystem may calculate a rough approximation of the satellite attitude on power-up, or after an interruption in satellite functioning that causes the satellite to lose track of its current attitude. Once the attitude is roughly determined, the communications device can search for the target satellite using a defocused beam as described above. Then, after a link is established, the method of the present invention may determine the initial satellite attitude. Those of skill in the art may imagine many other uses of the present invention.

The present invention can be more fully understood with reference to the figures. FIG. 1 illustrates a simplified diagram of satellite-based, cellular communications system 50 in accordance with a preferred embodiment of the present invention. Communications system 50 comprises terrestrial-based nodes 66 and space-based nodes. In FIG. 1, space-based communications nodes are illustrated as satellites 52. This is not intended to be limiting, and those skilled in the art will recognize that other embodiments can be envisioned in which space-based nodes are not satellites.

Communications system 50 is dispersed on and around a celestial body (e.g., earth) through use of terrestrial-based nodes 66 and orbiting satellites 52. Terrestrial-based nodes 66 can be located on or near the surface of the earth.

In FIG. 1, six orbits 70, 72, 74, 76, 78, 80 are shown. However, this is not essential and more or fewer orbital planes may be used. While the present invention is advantageously employed when non-polar orbits are being used, it is also applicable with polar orbiting satellites. For example, satellites can be located in inclined orbits in order to provide large dual coverage regions for terrestrial-based nodes 66.

Satellites 52 occupy orbits 70, 72, 74, 76, 78, 80 which may be low-earth orbits, or medium-earth orbits. For clarity, FIG. 1 illustrates only a few of satellites 52 and a few terrestrial-based nodes 66. However, this is not essential and more or fewer satellites and more or fewer terrestrial-based nodes may be used.

Satellites 52 communicate with other satellites over "cross-links" 54. As defined herein, a "cross-link" is a communications link between two satellites. A cross-link may be, for example, a narrow beam transmission emanating from a satellite. Cross-links 54 may be radio frequency (RF) links or optical (laser) links, for example.

Crosslinks 54, among other things, provide communications channels for carrying subscriber data and control data to any one of the satellites 52 in communications system 50. By using crosslinks, such as illustrated by crosslinks 54, attitude determination data from one satellite can be routed through one or more satellites to other satellites and to terrestrial-based nodes located at various points on the surface of the earth. Alternate embodiments can be envisioned that include crosslinks which are different than those illustrated in FIG. 1.

Satellites 52 communicate with terrestrial-based nodes 66 using "earth-links" 56. As defined herein, an "earth-link" is a communications link between satellite 56 and terrestrial-based node 66. An earth-link may be, for example, a narrow beam transmission emanating from a satellite. Earth-links 56 may be radio frequency (RF) links or optical (laser) links, for example.

Terrestrial-based nodes 66 can include subscriber units, gateways, and control centers. For example, subscriber units can be communications terminals located at homes and businesses. For example, a gateway can enable one communications system to exchange messages with one or more different systems (not shown). For example, a control center can perform control functions for communications platforms. In alternate embodiments, one or more terrestrial-based nodes can be used to perform one or more attitude determination tasks.

Figure 2:
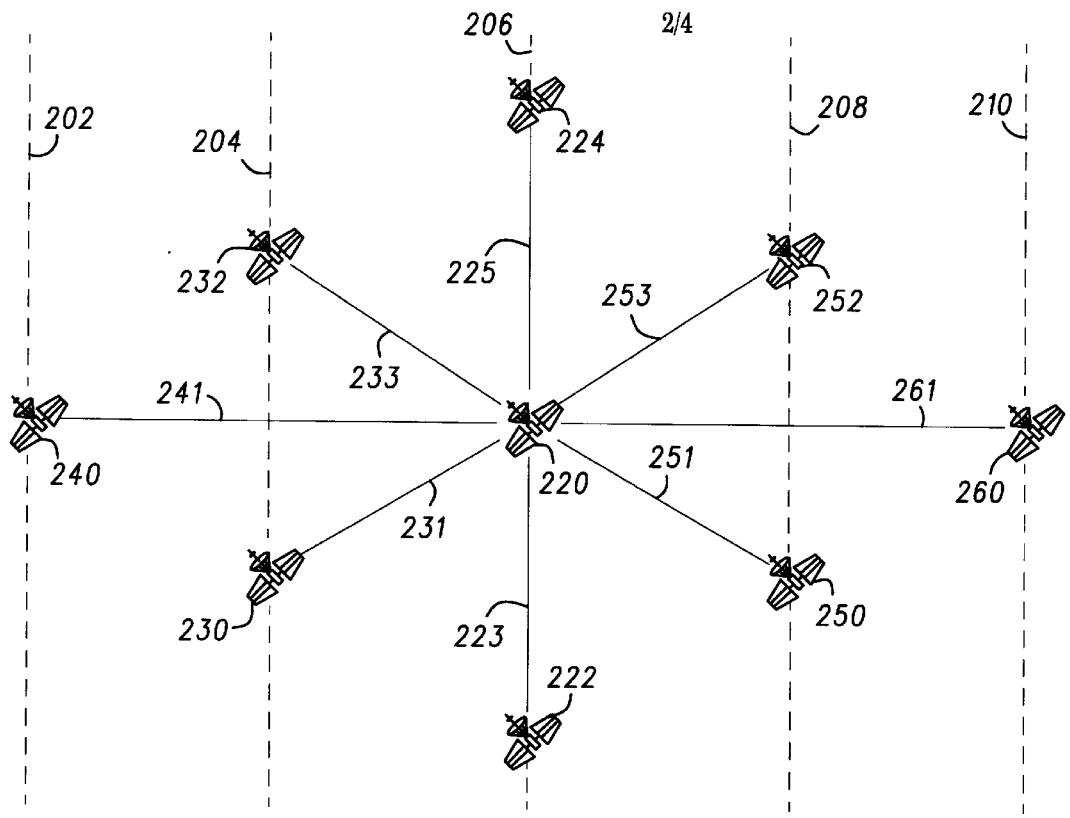
FIG. 2 shows a simplified diagram of potential cross-links for a satellite in accordance with a preferred embodiment of the present invention.

FIG. 2 shows a simplified diagram of potential cross-links for a satellite in accordance with a preferred embodiment of the present invention. In FIG. 2, multiple satellites 220, 230, 232, 240, 250, 252, and 260 are shown traveling in orbital planes 202, 204, 206, 208, and 210. Cross-links 241, 231, 233, 223, 225, 251, 253, and 261 represent eight potential cross-links that satellite 220 can maintain with nearby satellites 230, 232, 240, 250, 252, and 260. During normal operation, satellite 220 may communicate over several of the potential cross-links simultaneously. In the preferred embodiment, satellite 220 continuously maintains communications with adjacent satellites in more than one orbital plane through cross-links.

Cross-links 223 and 225 that are maintained with satellites 222 and 224 in the same orbital plane 206 are referred to herein as "in-plane links", and cross-links 241, 231, 233, 251, 253, and 261 that are maintained with satellites 230, 232, 240, 250, 252, and 260 in nearby orbital planes 202, 204, 208, and 210 are referred to herein as "cross-plane links". In a preferred embodiment, a satellite continuously maintains at least one in-plane link and at least one cross-plane link. In an alternate embodiment, a satellite maintains at least one cross-plane link to its left and one cross-plane link to its right for as much of its orbit as is practicable.

For convenience, the present invention's method of determining a satellite's current attitude may be described with reference to satellite body axes and a line of sight (LOS) vector. Satellite body axes are axes that are fixed with respect to the satellite body. A LOS vector points directly at the other satellite, whether the other satellite is in its expected position or not. When a communications link is established, a LOS vector is co-linear with the communications link between the satellites. The concepts of satellite body axes and LOS vector are well known to those of skill in the art.

For in-plane links, the LOS vectors are normally slowly-varying in direction with respect to the satellite body axes (assuming the satellite body axes do not move significantly with respect to the satellite's velocity vector). This is due to the phenomenon that satellites traveling in the same, nearly circular orbit path do not move significantly relative to satellites in the same plane.

For cross-plane links, however, the LOS vectors can change significantly. This is due to the relative motion of the cross-plane satellites with respect to a reference satellite, such as illustrated by satellite 220. Orbital planes are not parallel to each other as illustrated in FIG. 2. For example, as satellites move nearer to the poles, orbital planes can converge. In addition, in some communications systems orbital planes can cross. In the situations where there is relative motion between satellites, this relative motion between satellites causes the LOS vectors to move significantly with respect to the satellite body axes. Desirably, the LOS vectors will move as a function of time. Because satellite trajectories are predictable, the direction of the LOS vector may be determined based on the expected position of the other satellite.

Figure 3:
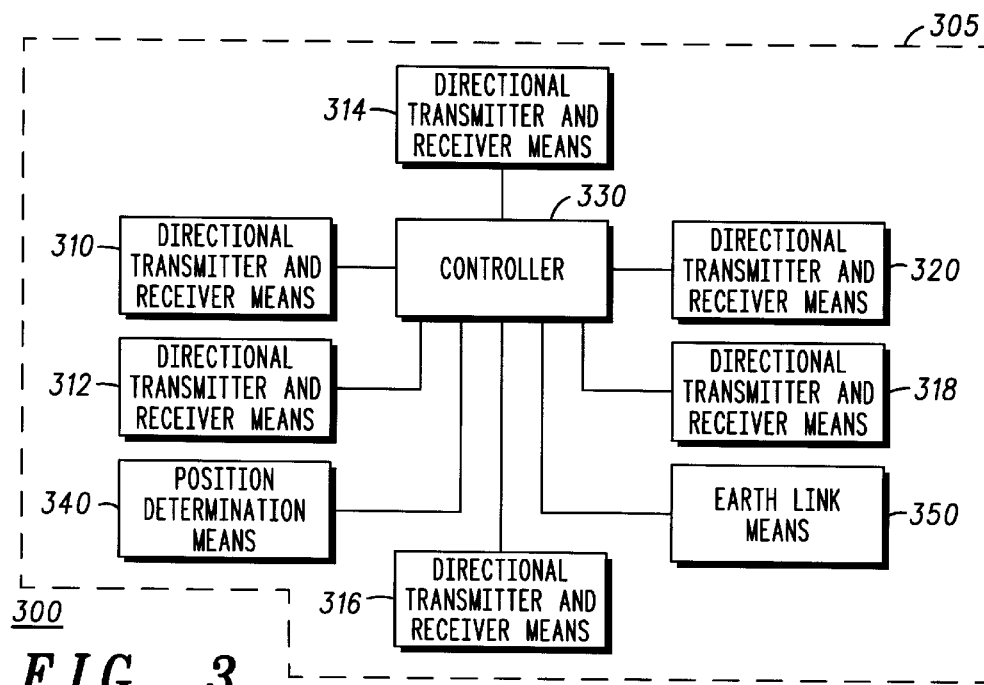
FIG. 3 shows a simplified block diagram of a satellite adapted to perform attitude determination procedures in accordance with a preferred embodiment of the present invention.

FIG. 3 shows a simplified block diagram of a satellite adapted to perform attitude determination procedures in accordance with a preferred embodiment of the present invention. Satellite 300 comprises a body 305, a plurality of directional transmitter and receiver means 310, 312, 314, 316, 318, and 320 which are coupled to body 305. Satellite body 305 establishes a set of body axes and at least one reference point, which are used to establish a satellite's known position and orientation.

In a preferred embodiment, six directional transmitter and receiver means 310, 312, 314, 316, 318, and 320 exist on-board a satellite so that as many as six cross-links may be simultaneously maintained. However, as would be obvious to one of skill in the art based on the description herein, more or fewer directional transmitter and receiver means may reside on-board a satellite, and more or fewer cross-links may be maintained.

In addition, satellite 300 comprises controller 330 that is coupled to directional transmitter and receiver means 310, 312, 314, 316, 318, and 320. Also, satellite 300 comprises position determination means 340 which is coupled to controller 330 and earth-link means 350 which is coupled to controller 330.

To establish cross-links using a laser or other narrow-beam device, a satellite must accurately point the communications beam from the laser or other narrow-beam device toward the cross-link companion satellite. For this purpose, satellite 300 uses directional transmitter and receiver means 310, 312, 314, 316, 318, and 320. Typically, directional transmitter and receiver means 310, 312, 314, 316, 318, and 320 comprise lasers or very high-frequency radio transceivers that are used to establish and maintain cross-links between satellites.

Satellite 300 uses position-determining means 340 to determine a position for satellite 300 relative to an inertial reference system. In a preferred embodiment, position-determining means 340 comprises at least one Global Positioning Satellite (GPS) receiver that is used to geo-locate satellite 300. Position determining means 340 is coupled to body 305 and coupled to controller 330. Position determining means 340 provides location information and GPS time information, among other things, to controller 330. Controller 330 uses location information and GPS time information to determine a known position at a particular time for the satellite relative to an inertial reference system.

Satellite 300 uses earth-link means 350 to establish communications links, such as illustrated by links 56 in FIG. 1, with at least one terrestrial-based communications node. Earth-link means 350 can send beam-pointing information, among other things, to controller 330. This beam-pointing information can be used during attitude determination procedures.

In addition, earth-link means 350 can be used to obtain information from a terrestrial-based node. This information can be used to determine known positions for communications nodes at specific times. For example, position information for a number of satellites or terrestrial-based nodes can be sent to a particular satellite to help that satellite perform attitude determination procedures. In addition, satellite 300 can use earth-link means to send information about its current position, velocity, and timing to a terrestrial-based node.

Controller 330 obtains data (e.g., angular orientation measurements) from directional transmitter and receiver means 320. Controller 330 obtains and determines the satellite's current attitude based on that data. In a preferred embodiment, controller 330 comprises a data storage means (not shown) which is used to store, among other things, the determined attitude.

Controller 330 monitors, among other things, system time. Controller 330 uses system time to establish a basis for determining, among other things, past, present and future positions. In a preferred embodiment, system time is derived from a GPS system.

Controller 330 comprises memory (not shown) to store data that serve as instructions to controller 330, and that, when executed by controller 330, cause satellite 300 to carry out particular aspects of the method of the invention, as will be discussed in detail below. In addition, memory desirably includes variables, tables, and databases that are manipulated during the operation of satellite 300.

Figure 4:
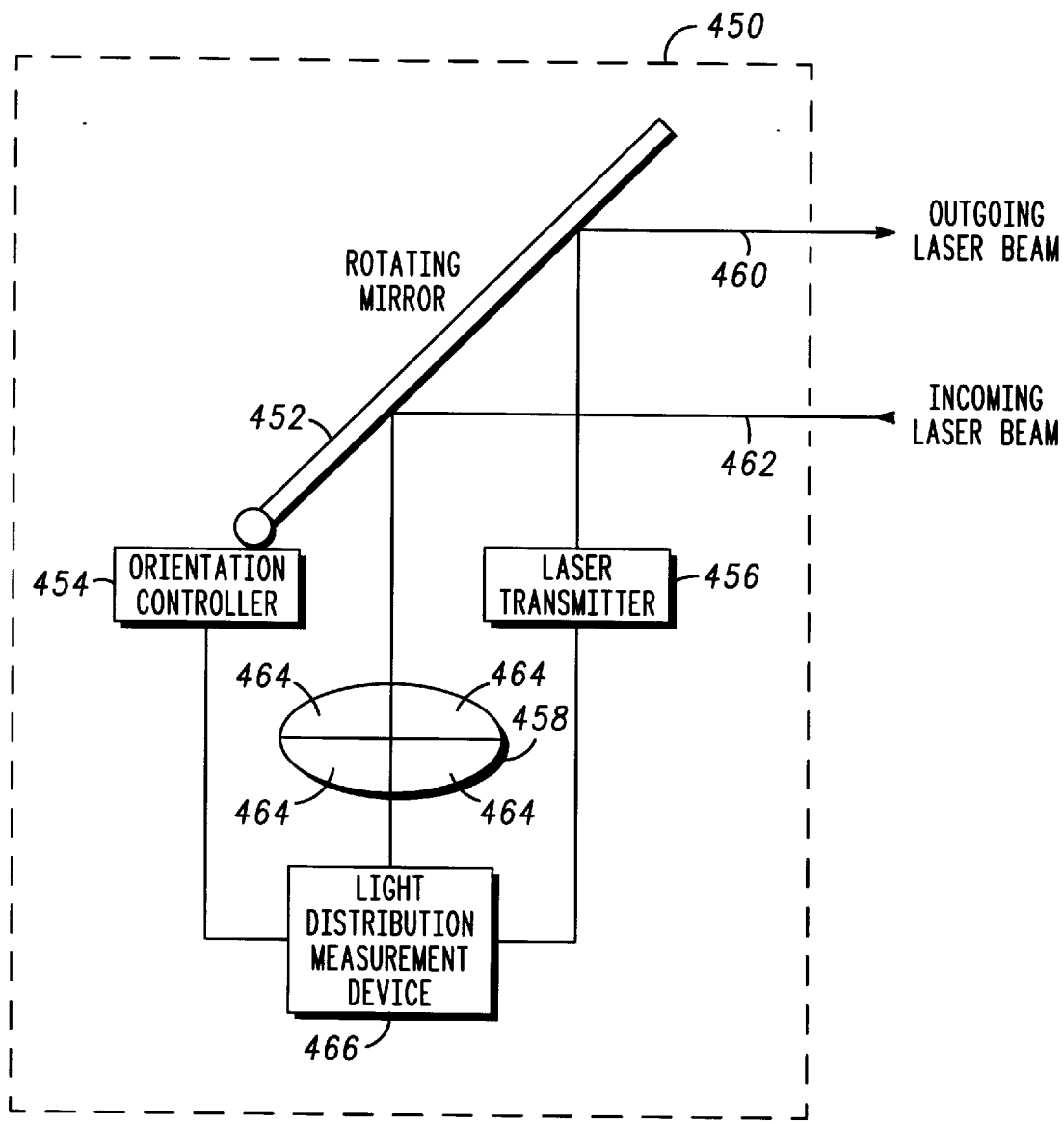
FIG. 4 shows an example of a laser device in accordance with a preferred embodiment of the present invention.

FIG. 4 shows an example of a laser device in accordance with a preferred embodiment of the present invention. In the preferred embodiment, directional transmitter and receiver means 310, 312, 314, 316, 318, and 320 (FIG. 3) comprise at least one narrow-beam laser device 450. Laser device 450 comprises rotating mirror 452, orientation controller 454, laser transmitter 456, photocells 458, and light distribution measurement device 466. Rotating mirror 452 is coupled to orientation controller 454. As used herein, an "orientation controller" is a device (e.g., a servo and resolver) that controls the pointing direction of the rotating mirror 452 and measures and reports orientation controller data to an attitude determination subsystem (e.g., controller 330, FIG. 3). In a preferred embodiment, orientation controller data comprises pointing angle information and accuracy information.

Laser device 450 also comprises a laser transmitter 456 and photocells 458. To send an outgoing laser beam 460 to a particular destination (e.g., a companion satellite), laser transmitter 456 directs the outgoing laser beam 460 at rotating mirror 452. Orientation controller 454 moves rotating mirror 452 so that the outgoing laser beam 460 is directed toward the intended destination satellite. As would be obvious to one of skill in the art based on the description herein, the intended destination may be any device whose position is known (e.g., a ground site).

In the preferred embodiment, a communications channel is established between satellites when communications links are established in both directions. Thus, when an incoming communications link is established, an incoming laser beam 462 from the destination satellite also impacts rotating mirror 452. Rotating mirror 452 toward photocells 458 diverts this incoming laser beam 462. Photocells 458 are used to receive communications data within the incoming laser beam 462. Because it may be desirable to have outgoing laser beam 460 and incoming laser beam 462 as close together as possible (e.g., to avoid the requirement of an extremely flat rotating mirror 452), outgoing laser beam may be directed through an aperture in photocells 458. Photocells 458 are desirably divided into quadrants 464. Photocells 458 are coupled to a light distribution measurement device 466, which measures the quantity of incoming laser, beam light received by each quadrant 464. When rotating mirror 452 is accurately oriented, the quantity of incoming laser beam light received by each quadrant 464 is roughly equal. When the quantity of incoming laser beam light received by each quadrant 464 is unequal, light distribution measurement device 466 informs orientation controller 454. Orientation controller 454 then modifies the orientation of rotating mirror 452 until rotating mirror 452 is accurately oriented.

The precision necessary to maintain the accurate orientation needed for communications using narrow beams is high. According to the present invention, a narrow beam (e.g., a couple of hundred microradians) is fixed on another satellite that may be several thousands of kilometers away. With accurate knowledge of satellite positions, the angles relevant to attitude determination may be fixed with extremely high precision. Consequently, orientation controller 454 contains extremely accurate information about the angles at which the incoming laser beam 462 and outgoing laser beam 460 are directed. These angles may be related to the satellite body axes. Then, using the known orbital position of the satellites, the orientation of the satellite body axes may be related to inertial or other axes and the current attitude of the satellite may be accurately determined.

FIG. 5 illustrates a flowchart of a method of determining current attitude in accordance with a preferred embodiment of the present invention. Procedure 500 begins in step 502. For example, step 502 could be the result of a command from another controller on-board the satellite or from a control center within the communications system. In step 502, one or more initialization tasks can be performed.

In step 504, a first narrow-beam communications channel is established between a first communications node at a first known position and a second communications node at a second known location. In a preferred embodiment, the first and second communications nodes are satellites.

"Position data" refers to the position of a satellite at a particular time. A satellite's current position can be determined using a GPS system. Satellite orbit positions can be determined, for example, from measurements by ground-tracking satellites as the satellites pass overhead. Determine attitude procedures may be performed using analytical geometry calculations well known to those of skill in the art.

In step 506, the first pointing angle for the first outgoing narrow-beam communications link is determined. In a preferred embodiment, the controller reads orientation controller data received from a particular directional transmitter and receiver means (e.g., directional transmitter and receiver means 310, 312, 314, 316, 318, 320; FIG. 3). Typically, this orientation controller data comprises angular information for the LOS vector associated with this first outgoing beam. Controller 330 (FIG. 3) determines the direction of this first LOS vector relative to the satellite body axes by using the orientation controller data.

In step 508, a second narrow-beam communications channel is established between the first communications node at the first known position and a third communications node at a third known location. In a preferred embodiment, the first and third communications nodes are satellites.

In step 510, the second pointing angle for the second outgoing narrow-beam communications link is determined. In a preferred embodiment, the controller reads orientation controller data received from a second directional transmitter and receiver means. Typically, this orientation controller data comprises angular information for the LOS vector associated with this second outgoing beam. Controller 330 determines the direction of this second LOS vector relative to the satellite body axes by using the orientation controller data.

In step 512, the current attitude for the first communications node is determined using the first known position, the second known position, the third known position, the first pointing angle and the second pointing angle.

In the preferred embodiment, the current attitude is determined by combining all pointing angles. To get a complete attitude representation, pointing angles from at least a second LOS vector must be determined and combined with the attitude data from the first LOS vector. Generally, the most accurate attitude determination may be made when the second LOS vector is oriented orthogonally from the first LOS vector.

In step 514, a query is performed to determine if additional links are required. When additional links are required, then procedure 500 branches to step 516 and iterates as shown in FIG. 5. When additional links are not required, then procedure 500 branches to step 522 and ends.

In step 516, an additional narrow-beam communications channel is established between the first communications node at the first known position and an additional communications node at an additional known location. In a preferred embodiment, additional communications nodes can be satellites and terrestrial-based communications nodes.

In step 518, a pointing angle for an additional outgoing narrow-beam communications link is determined. In a preferred embodiment, the controller reads orientation controller data received from an additional directional transmitter and receiver means. Typically, this orientation controller data comprises angular information for the LOS vector associated with this additional outgoing beam. Controller 330 determines the direction of this additional LOS vector relative to the satellite body axes by using the orientation controller data.

In step 520, the current attitude for the first communications node is determined using the first known position, the second known position, the third known position, the first pointing angle, the second pointing angle, and any additional pointing angles and additional known positions that may have been determined in steps 516 and 518. In step 520, all of the available attitude data is combined to produce a single attitude measurement (e.g., pitch, yaw, and roll angles).

After completing step 520, procedure 500 branches back to step 514.

Controller 330 may use equivalent representations of the pointing angles and LOS vectors as would be obvious to those of skill in the art based on the description herein. For example, the pointing angles may be represented using three orthogonal Euler angles, direction cosines or in terms of cone and clock angles about the satellite body axes.

In the preferred embodiment, determine current attitude procedures are done continuously. Attitude determination procedures may be performed when two or more LOS vectors are available for current attitude data calculations. Attitude data is calculated for all available LOS vectors at once. In a preferred embodiment, previously calculated results are stored in the controller.

In steps 512 and 520, current attitude data may be stored and/or retrieved. For example, a database may be used to store previously determined attitude data. Stored attitude data can be retrieved and used in steps 512 and 520. Each time new attitude data is determined about a new LOS vector; the newly determined attitude data can be combined with the previously determined data. Recently stored prior attitude data allows a full determination of attitude in a degraded fashion when only one new LOS is available for measurement.

In steps 512 and 520, weighting factors are applied to each piece of data according to its probable accuracy. Accuracy may be based on, for example, the relative accuracy between two rotating mirrors (e.g., rotating mirror 452, FIG. 4) in different directional transmitter and receiver means (e.g., directional transmitter and receiver means 310, 312, 314, 316, 318, 320; FIG. 3) or the orientation of the LOS vector with respect to the velocity vector.

For example, measurements from a LOS vector that is close to the velocity vector (e.g., from an in-plane cross-link) may give fairly accurate pitch and yaw data, but minimally useful roll data (assuming the satellite body roll axis is approximately co-linear with the LOS vector and the velocity vector). Therefore, the determine current attitude steps (512, 520) would heavily affect the pitch and yaw data, but lightly influence the roll data.

Alternatively, measurements from a LOS vector that is substantially perpendicular to the velocity vector (i.e., a cross-plane cross-link) would give fairly accurate roll and yaw data, but less useful pitch data. The weighting factors used in the determine current attitude steps (512, 520) would heavily influence the roll and yaw data, but lightly affect the pitch data.

It is obvious to those of skill in the art based on the description herein that the determine current attitude steps (512, 520) may use many different data combination methods. For example, the determine current attitude steps (512, 520) may be averaging steps, such as by simply adding together all measurements and taking an average. Alternatively, each determine current attitude step may use a filter (e.g., weighted least squares fit or a Kalman filter) to combine the measurements. Which data combination method is used is not important to the invention.

Additionally, any number of LOS vectors may be combined at a particular time. Although at least two sets of LOS attitude data are necessary for a complete current attitude measurement, more sets of LOS attitude data may be combined. As the number of sets of LOS attitude data increases, the accuracy of the current attitude measurement should also increase.

An attitude relative to other bodies or an attitude relative to an inertial coordinate system may represent the satellite attitude. Conversion of a relative attitude to the inertial coordinate system may be performed using orthogonal or spherical geometry calculations that are well known to those of skill in the art.

After the current attitude is determined, the calculated current attitude can be used to adjust the satellite to a new attitude, if necessary. For example, this may be done using control actuators that provide impetus to adjust the satellite's attitude. Typically, the current attitude is stored and used by other satellite subsystems. For example, the satellite may use the current attitude data to determine the pointing angles for other transmitters and receivers. Additionally, a satellite may transmit the calculated current attitude data (either relative or inertial data) to other neighboring satellites or to a terrestrial-based node. A satellite may also use current attitude information to adjust the orientation of its solar panels.

In the preferred embodiment, procedure 500 is performed on-board a satellite (e.g., satellite 52, FIG. 1). However, as would be obvious to one of skill the art based on the description herein, any data or intermediate results determined at any step of procedure 500 may be transmitted to a terrestrial-based node or another satellite.

In summary, a method and apparatus have been described for determining the current attitude of a satellite using very narrow-beam cross-links. The advantages over the prior art are numerous.

These advantages are described in more detail above and include:

elimination of heavy, additional attitude-determination equipment, resulting in cost savings and lower weight and electrical energy demands on the satellite;

the ability to calculate a complete attitude at any time using only the communications apparatus on-board the satellite;

reduced reference-point memory required (star-referencing devices usually require the locations of many stars to be maintained in an on-board catalog. The present invention requires the position of only the very few nearby satellites with which it will be communicating directly); and more accurate results than most prior-art methods.

Thus, an improved method and apparatus for attitude determination has been described which overcomes specific problems and accomplishes certain advantages relative to prior-art methods and mechanisms. The improvements over known technology are significant. The expense, weight, and inaccuracies of previous methods are avoided.

The foregoing description of the specific embodiments will so fully reveal the general nature of the invention that others can, by applying current knowledge, readily modify and/or adapt for various applications such specific embodiments without departing from the generic concept and, therefore, such adaptations and modifications are intended to be comprehended within the meaning and range of equivalents of the disclosed embodiments. For example, although the description of the present invention describes a satellite communications system, the present invention would apply equally well to other communications systems where the positions of multiple communications devices are known (e.g., trains, or ships). Additionally, although laser transmitters are emphasized, the present invention may utilize any narrow-beam channel for attitude calculations (e.g., high-frequency RF communications). As would be obvious to one of skill in the art based on the description herein, the narrow beams utilized in the present invention to determine attitude need not be used for communications purposes. The narrow beams may be used for other purposes, or for no other purpose except attitude determination. Thus, the present invention is not limited to use by communications devices. Any device capable of transmitting and receiving narrow beams may utilize the present invention.

It is to be understood that the phraseology or terminology employed herein is for the purpose of description and not of limitation. Accordingly, the invention is intended to embrace all such alternatives, modifications, equivalents, and variations as fall within the spirit and broad scope of the appended claims.

What is claimed is:

1. A method for determining an attitude of a first communications node within a plurality of communications nodes, wherein the plurality of communications nodes have known positions and are coupled to each other by narrow beam communications links, the method comprising the steps of:

a) establishing a first narrow beam communications link between the first communications node at a first known position and a second communications node at a second known position;

b) determining, by the first communications node, a first line of sight (LOS) vector, the first LOS vector describing a pointing angle of the first narrow beam communications link relative to a first axis of the communications node;

c) establishing a second narrow beam communications link between the first communications node at the first known position and a third communications node at a third known position;

d) determining, by the first communications node, a second LOS vector, the second LOS vector describing a pointing angle of the second narrow beam communications link relative to a second axis of the first communications node, wherein the second LOS vector is substantially orthogonal to the first LOS vector; and e) determining a current attitude of the first communications node based on the first LOS vector, the first known position, the second known position, the second LOS vector, and the third known position, wherein step e) further comprises the step of applying weighting factors to the first and second LOS vectors.

2. The method as claimed in claim 1, wherein step e) further comprises the steps of:

e1) establishing a third narrow beam communications link between the communications nodes at the first known position and a fourth communications node at a fourth known position;

e2) determining, by the first communications node, a third LOS vector, the third LOS vector describing a pointing angle of the third narrow beam communications link relative to an axis of the first communications node, wherein the third LOS vector is substantially orthogonal to the first LOS vector; and e3) determining the current attitude of the first communications node based on the first LOS vector, the first known position, the second known position, the second LOS vector, the third known position, the third LOS vector, and the fourth known position.

3. The method as claimed in claim 1, wherein the plurality of communications nodes comprises at least one satellite.

4. The method as claimed in claim 1, wherein the plurality of communications nodes comprises at least one non-geostationary satellite.

5. The method as claimed in claim 1, wherein the plurality of communications nodes comprises at least one terrestrial communications device.

6. The method as claimed in claim 1, wherein the plurality of communications nodes comprises a plurality of low-earth orbit (LEO) satellites having known orbital positions.

7. The method as claimed in claim 1, the method further comprising the step of:

adjusting the first communications node to a new attitude based on the current attitude.

8. The method as claimed in claim 1, the method further comprising the step of:

using the current attitude to determine a pointing angle for a communications beam broadcast from the first communications node.

9. The method as claimed in claim 1, the method further comprising the step of:

storing the current attitude of the first communications node.

10. The method as claimed in claim 1, the method further comprising the step of:

transmitting the current attitude to another communications node.

11. The method as claimed in claim 1, the method further comprising the step of:

reorienting at least one communications beam based on the current attitude.

12. The method as claimed in claim 1, the method further comprising the steps of:

comparing the current attitude with a second attitude determined by an attitude determination subsystem; and declaring an error condition when a difference between the current attitude and the second attitude is greater than a predetermined threshold.

13. The method as claimed in claim 1, wherein step a) further comprises the steps of:

a1) determining an initial attitude of the first communications node using a first attitude determination system coupled to the first communications node;

a2) determining an estimate of the second known position; and a3) establishing an initial communications link between the first communications node and the second communications node using a defocused beam.

* * * * *